United States Patent [19]
Gellert

[11] Patent Number: 5,507,636
[45] Date of Patent: Apr. 16, 1996

[54] INJECTION HOLDING HEATED NOZZLE WITH PROTECTIVE TUBES

[76] Inventor: Jobst Gellert, 7A Prince Street, Georgetown, Ontario, Canada L7G2X1

[21] Appl. No.: 312,532

[22] Filed: Sep. 26, 1994

[30] Foreign Application Priority Data

Aug. 2, 1994 [CA] Canada .................................. 2129286

[51] Int. Cl.⁶ ................................................. B29C 45/20
[52] U.S. Cl. ....................................... 425/549; 264/328.15
[58] Field of Search ........................ 425/549; 264/328.15

[56] References Cited

U.S. PATENT DOCUMENTS 5,235,737  8/1993  Gellert .

5,266,023  11/1993  Renwick .

*Primary Examiner*—Tim Heitbrink
*Attorney, Agent, or Firm*—Dalesman & Company

[57] ABSTRACT

An injection molding nozzle with a collar having two segments mounted around the rear end of an elongated central body having a hollow central core. A helical portion of an electrical heating element is cast in a copper alloy conductive portion around the central core. The heating element has a pair of lead portions which extend outwardly through the collar into a ceramic insulative connector. The lead portions extend in stainless steel protective tubes having inner ends rigidly cast in the copper alloy conductive portion over which the insulative connector is mounted.

4 Claims, 4 Drawing Sheets

INJECTION HOLDING HEATED NOZZLE WITH PROTECTIVE TUBES

BACKGROUND OF THE INVENTION

This invention relates generally to injection molding and more particularly to an injection molding nozzle with heating element protective tubes extending outwardly through the collar.

Injection molding nozzles having an integral electrical heating element with lead portions extending outwardly into a radially extending terminal near the rear end are well known in the art. In the past, the components of these nozzles have usually been integrally brazed together in a one-piece structure having a rigid electrical terminal protecting against damage to the lead portions of the heating element. For instance, in the applicant's U.S. Pat. No. 5,235,737 which issued Aug. 17, 1993 the lead portions extend into metal connectors in a ceramic insulator which is surrounded by an outer protective steel sleeve screwed onto a rigid stud. In U.S. Pat. No. 5,266,023 to Renwick which issued Nov. 30, 1993 the lead portions of the heating element extend directly into a ceramic insulative connector which is similarly protected against damage by a protective outer steel sleeve screwed onto a rigid stud.

More recently, the applicants' Canadian Patent Application Ser. No. 2,127,211 filed Jun. 30, 1994 entitled "Injection Molding Nozzle with Removable Collar Portion" shows an injection molding nozzle with the lead portions of the heating element extending outwardly into a removable insulative connector without any protective outer sleeve. While this has the advantage of being less costly to make, it has the disadvantage that the relatively fragile protruding lead portions of the electrical heating element are not adequately protected against damage by the ceramic insulative connector.

SUMMARY OF THE INVENTION

Accordingly, it is an object of the present invention to at least partially overcome the disadvantages of the prior art by providing a heated injection molding nozzle in which the lead portions of the electrical heating element are protected against damage by protective tubes extending rigidly into the insulative connectors.

To this end, in one of its aspects, the invention provides an injection molding nozzle to be seated in an opening in a mold, the nozzle having a rear end, a front end, and a melt channel extending therethrough to convey melt forwardly toward at least one gate extending through the mold to a cavity, the nozzle having an elongated central body and an outer collar, the outer collar extending around the central body adjacent the rear end thereof and comprising two separate segments which are received around the elongated central body in a position interlocked with the elongated central body to prevent longitudinal movement of the elongated central body relative to the outer collar, the elongated central body of the nozzle having an elongated hollow core, a conductive portion cast around the hollow core and an electrical heating element with a helical portion extending between two lead portions, the helical portion of the electrical heating element being cast into the conductive portion around the elongated central core, each of the lead portions of the electrical heating element having a lead wire extending outwardly therefrom, one pair of abutting ends of the two segments of the outer collar each having a matching notch which in the interlocking position together form a radial opening extending through the outer collar through which the two lead portions of the electrical heating element extend outwardly into an insulative connector, the insulative connector having a pair of holes therethrough and an inner end portion securely received in the radial opening formed by the two notches, the improvement wherein an elongated protective tube fits over each of the outwardly extending lead portions of the electrical heating element, each of the protective tubes having an inner portion and an outer portion extending to an outer end, the inner portion of each protective tube being cast into the conductive portion of the central body, the outer portion of each protective tube fitting into one of the holes through the insulative connector, with the lead wire of each of the lead portions of the electrical heating element extending outwardly past the outer end of the tube further into said hole in the insulative connector for connection to a power wire.

Further objects and advantages of the invention will appear from the following description taken together with the accompanying drawings.

DETAILED DESCRIPTION OF THE INVENTION

Figure 1:
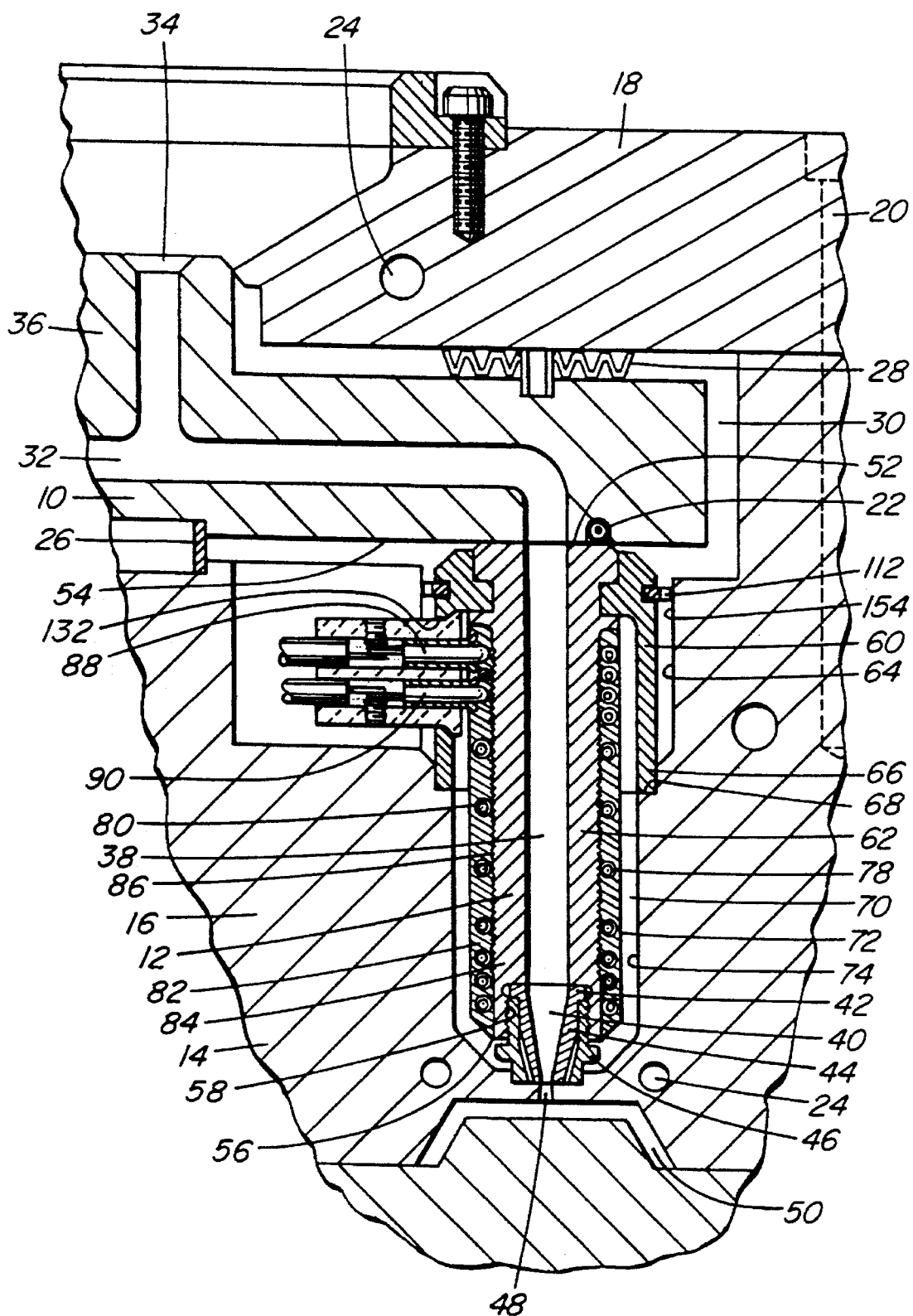
FIG. 1 is a sectional view of a portion of a multi-cavity injection molding system showing a nozzle according to a preferred embodiment of the invention.

Reference is first made to FIG. 1 which shows a portion of a multi-cavity injection molding system or apparatus having a melt distribution manifold 10 interconnecting several heated nozzles 12 according to the invention in a mold 14. While the mold 14 usually has a greater number of plates depending upon the application, in this case only a cavity plate 16 and a back plate 18 which are secured together by bolts 20 are shown for ease of illustration. In the embodiment shown, the melt distribution manifold 10 is heated by an integral electrical heating element 22 and the mold 14 is cooled by pumping cooling water through cooling conduits 24. The melt distribution manifold 10 is mounted between the cavity plate 16 and the back plate 18 by a central locating ring 26 and a number of insulative and resilient spacer members 28 which provide an insulative air space 30 between the heated manifold 10 and the surrounding mold 14.

A melt passage 32 extends from a central inlet 34 in a cylindrical inlet portion 36 of the manifold 10 and branches outwardly in the manifold 10 to convey melt through a central melt channel 38 in each of the heated nozzles 12. The melt then flows through an aligned melt duct 40 in a nozzle seal 42 having a hollow inner piece 44 and a threaded outer piece 46 to a sprue gate 48 extending through the cavity plate 16 to a cavity 50.

The rear end 52 of each nozzle 12 abuts against the front face 54 of the melt distribution manifold 10 and the front end 56 has a threaded seat 58 in which the two-piece seal 42 is seated. Each nozzle 12 has an outer collar 60 extending around an elongated central body 62 through which the central melt channel 38 extends. The nozzle 12 is seated in an opening 64 in the mold 14 by a forwardly extending flange portion 66 of the outer collar 60 sitting on a circular seat 68 in the opening 64 to provide an insulative air space 70 between the outer surface 72 of the nozzle 12 and the surrounding inner surface 74 of the mold 14.

In this embodiment, the central body 62 of the nozzle 12 is made with an electrical heating element 78 having a helical portion 80 cast into a copper alloy conductive portion 82 around a hot-work steel hollow core 84. The hollow core 84 is made with a threaded outer surface 86 to ensure that the copper alloy conductive portion 82 can be securely cast around it. The helical portion 80 of the heating element 78 extends from a first lead portion 88 along the central body 62 of the nozzle 12 and back to a second lead portion 90. The helical portion 80 of the heating element 78 is generally wound with its coils closer together near the rear and front ends 52, 56 of the nozzle 12 where there is more heat loss.

Figure 2:
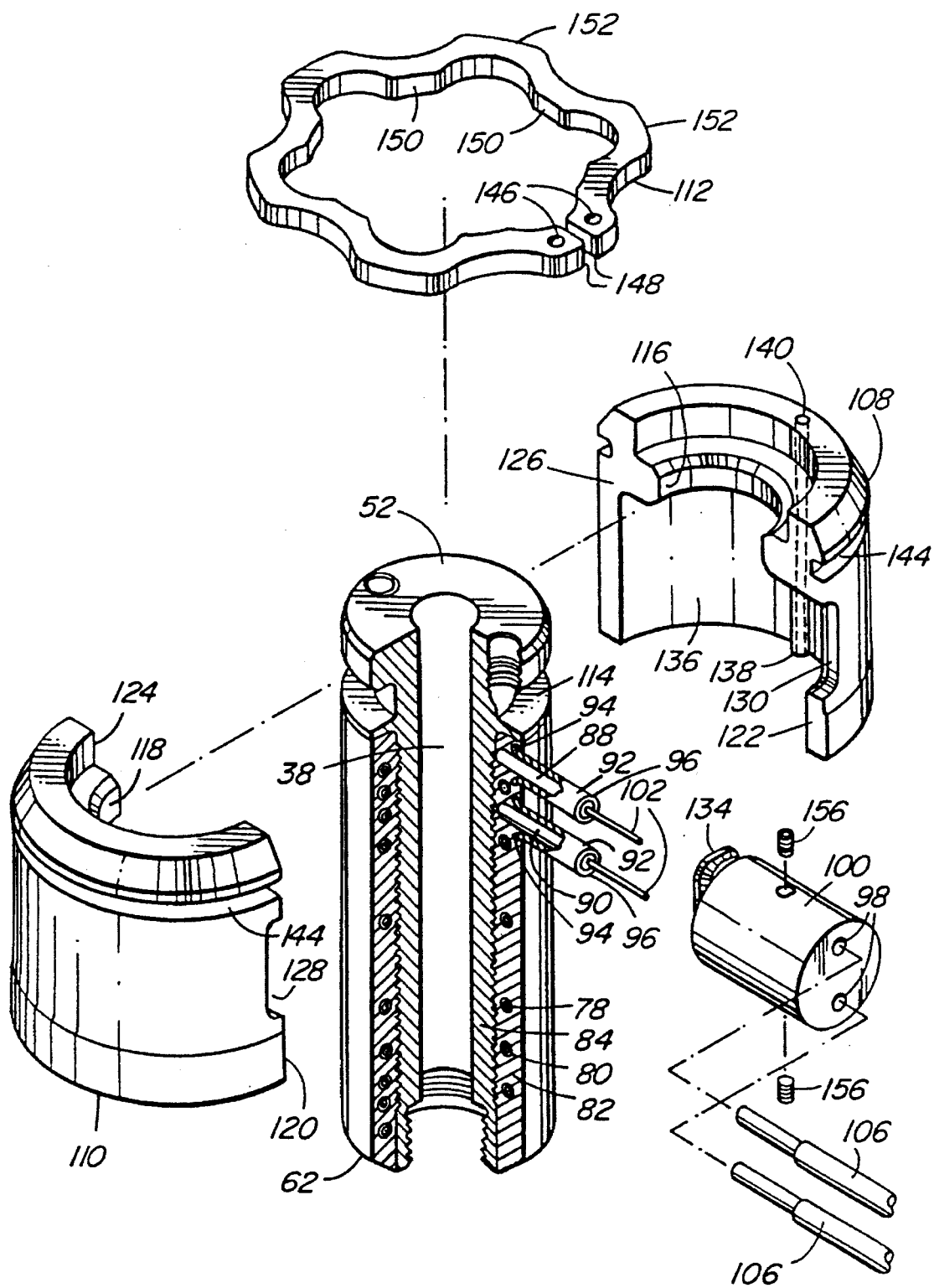
FIG. 2 is an exploded isometric view of the nozzle seen in FIG. 1 showing how it is made.
Figure 3:
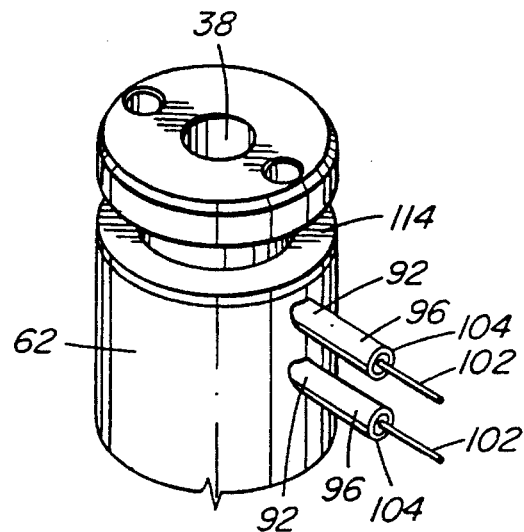
FIG. 3 is an isometric view showing how the protective tubes are cast into the central body of the nozzle.
Figure 4:
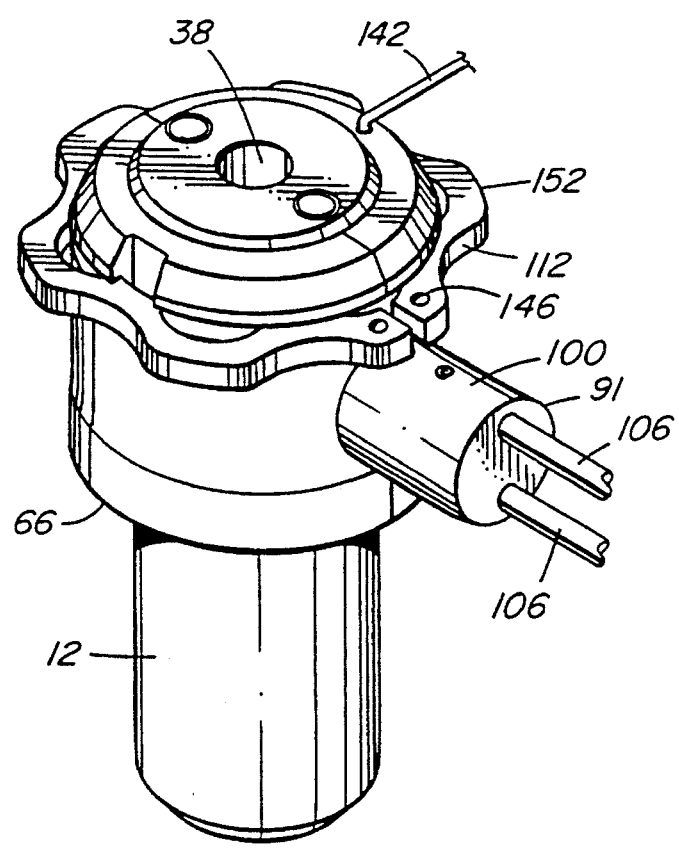
FIG. 4 is an isometric view of the assembled nozzle.

As seen in FIGS. 2, 3 and 4, the central body 62 of the nozzle 12 is made with the first and second lead portions 88, 90 of the heating element 78 extending outwardly into an electrical terminal 91 through stainless steel protective tubes 92 according to the invention. The protective tubes 92 have inner portions 94 which are rigidly cast in the copper alloy conductive portion 82 of the hollow core 84 and outer portions 96 which extend into a pair of holes 98 in a ceramic insulative connector 100 which is mounted over them. Each of the protective tubes 92 has a predetermined inner diameter to fit over one of the outwardly extending lead portions 88, 90 of the electrical heating element 78 and a predetermined outer diameter to fit into one of the holes 98 in the insulative connector 100. As is well known, the heating element 78 has a fine coiled resistance wire extending through an electrically insulating material such as magnesium oxide in a steel casing. The fine resistance wire connects to a larger diameter lead wire 102 which projects out from the outer end 104 of each protective tube 92 for connection to a power wire 106 from a power source (not shown) in the insulative connector 100. The two protective tubes 92 ensure the lead portions 88, 90 of the heating element 78 are protected from damage particularly before assembly and also provide a rigid mounting for the ceramic insulative connector 100. While the two protective tubes 92 are shown made of stainless steel, they can also be made of other suitable materials having the strength necessary to protect the lead portions 88, 90.

Reference will now be made particularly to FIG. 2 in describing the nozzle according to the preferred embodiment of the invention and how it is assembled and can be disassembled. As can be seen, the outer collar 60 has two separate segments or semicircular halves 108, 110 which together with insulative connector 100 are mounted and retained in place on the separate elongated central body 62 by a resilient retainer insulating and locating snap ring 112. As described above, the elongated central body 62 is made with the helical portion 80 of the heating element 78 cast in a copper alloy conductive portion 82 around a hot-work steel hollow core 84. The central body 62 has a circular channel 114 with a rectangular cross-section extending therearound adjacent the rear end 52. The semicircular segments 108, 110 of the outer collar 60 are made to fit around the central body 62 and each have a matching inwardly projecting flange 116, 118 which fit into the circular channel 114 in the central body 62 in an interlocking position to prevent longitudinal movement of the elongated central body 62 relative to the outer collar 60. When they are mounted in this interlocking position adjacent the rear end 52, the semicircular segments 108, 110 have two pairs of ends 120, 122, 124, 126 which abut against each other. One pair of abutting ends 120, 122 of the semicircular halves 108, 110 have matching notches 128, 130 which combine to form a radial opening 132 when the semicircular segments 108, 110 are mounted in place in the interlocking position. The radial opening 132 thus formed between the two semicircular segments 108, 110 is undercut to retainably receive a matching outwardly tapered inner end portion 134 of the insulative connector 100. While the two matching semicircular segments 108, 110 are shown as being the same shape and size, the inner surface 136 of one of them 108 has a longitudinally inwardly projecting ridge 138 through which a hole 140 is drilled to receive a thermocouple element 142 to monitor operating temperature. While only one segment 108 is shown having a thermocouple element hole 140, another one can also be provided in the other segment 110 if it is desirable to have alternate positions for the thermocouple element 142 or to have two thermocouple elements.

After the central body 62 is made with the hollow core 84, helical portion 80 of the heating element 78, and the inner portions 94 of the protective tubes 92 cast in the copper alloy conductive portion 82, the ceramic insulative connector 100 is then mounted on the projecting outer portions 96 of the protective tubes 92. The two semicircular segments 108, 110 of the outer collar 60 are then mounted around the central body 62 with the inwardly projecting flanges 116, 118 received in the channel 114 and the inner end portion 134 of the ceramic insulative connector 100 securely received in the radial opening 132. The split resilient retainer ring 112 is then mounted in a circular groove 144 extending around the two semicircular segments 108, 110 to clamp them together and securely retain all of the components in place. The split ring 112 has two small holes 146 near its opposite ends 148 to receive retaining ring pliers (not shown) to facilitate its installation and removal. The nozzles 12 are assembled this way prior to shipping to a customer for installation in a mold. If there is damage during shipping to the ceramic insulative connector 100, it is a simple matter to remove the split ring 112 and replace the insulative connector. However, the stainless steel protective tubes ensure the lead portions 88, 90 of the heating element will not be damaged. The split ring 112 is made of a springy material such as 17-4-PH stainless steel and has a number of spaced inwardly extending portions 150 and a number of spaced outwardly extending portions 152. Where the nozzles 12 are mounted in the mold 14, as seen in FIG. 1, the inwardly extending portions 150 are seated in the circular groove 144 around the two semicircular segments 108, 110 and the outwardly extending portions 152 abut against the cylindrical shaped inner surface 154 of the opening 64 in the mold 14 around the outer collar 60. This accurately locates the rear end 52 of the nozzle 12 in the opening 64 in the mold 14 without undue heat loss through the retaining ring 112 from the heated nozzle 12 to the cooled mold 14. The power wires 106 from the electrical power source are connected to the lead wires 102 extending from the lead portions 88, 90 of heating element 78 by set screws 156 which are screwed into the ceramic insulative connector 100.

In use, after assembly and installation in a mold 14, as shown in FIG. 1, electrical power is applied to the heating element 22 in the manifold 10 and to the heating elements 78 in the nozzles 12 to heat them to a predetermined operating temperature. Pressurized melt is applied from a molding machine (not shown) to the central inlet 34 of the melt passage 32 according to a predetermined cycle. The melt flows through the melt distribution manifold 10, nozzles 12, nozzle seals 42 and gates 48 into the cavities 50. After the cavities 50 are filled and a suitable packing and cooling period has expired, the injection pressure is released and the melt conveying system is decompressed to avoid stringing through the open gates 50. The mold 14 is then opened to eject the molded products. After ejection, the mold 14 is closed and the cycle is repeated continuously with a cycle time dependent upon the size of the cavities 50 and the type of material being molded.

Figure 5:
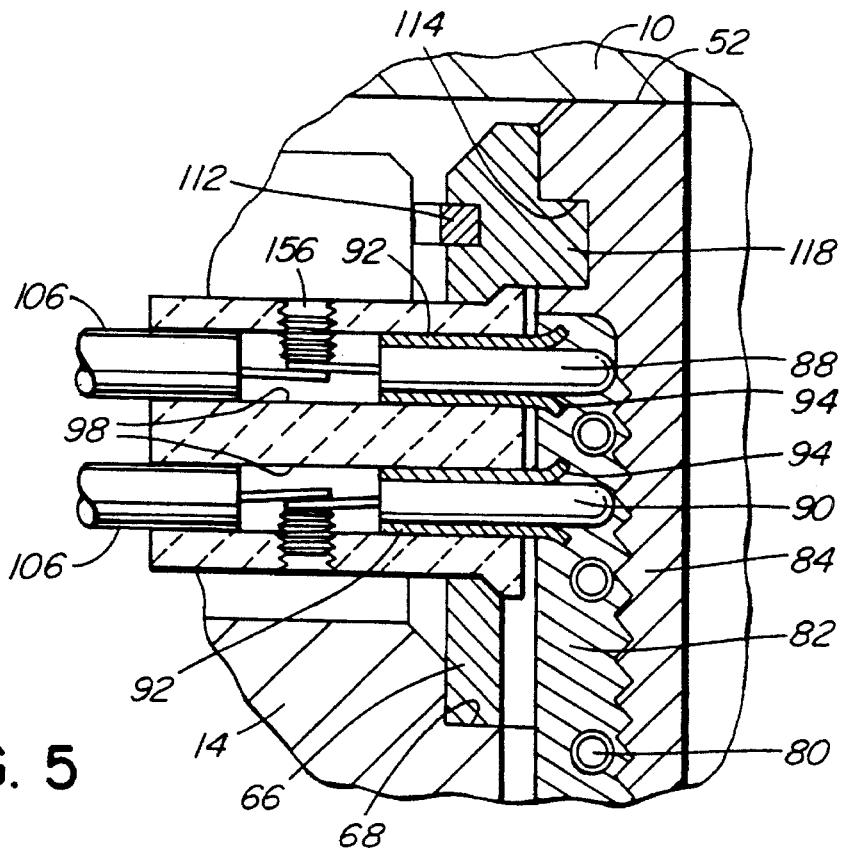
FIG. 5 is a sectional view of the terminal of a nozzle showing the lead portions of the heating element extending into a pair of protective tubes.
Figure 6:
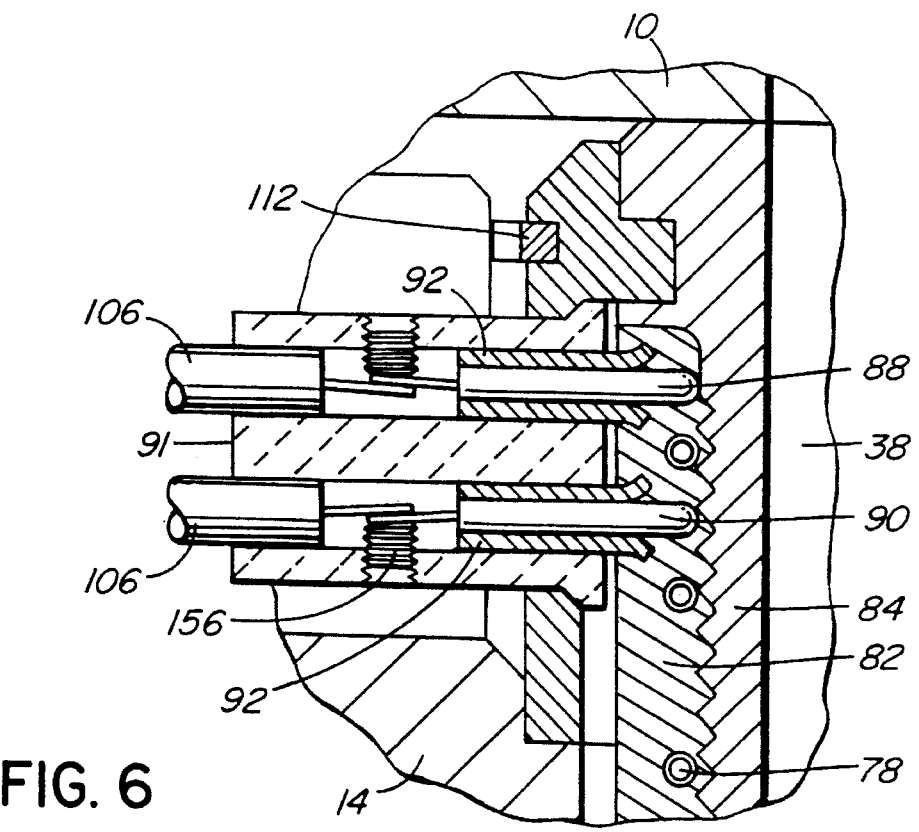
FIG. 6 is a similar sectional view of the terminal of a nozzle showing the lead portions of the heating element having a smaller diameter and the protective tubes having thicker wall sections to compensate.

Reference is now made to FIG. 6 which shows another embodiment of the invention in which everything is the same as described above and shown in FIG. 5 except that in this case the lead portions 88, 90 of the electrical heating element 78 have smaller diameters and the protective tubes 92 have compensating thicker wall sections. Thus, as can be seen from FIGS. 5 and 6, using protective tubes 92 with appropriate dimensions allows ceramic insulative connectors 100 having standard dimensions to be used in nozzles 12 in which the lead portions 88, 90 of the heating elements 78 have different diameters.

While the description of the nozzle with lead portions 88, 90 extending outwardly into the electrical terminal 91 through a pair of protective tubes 92 according to the invention has been given with respect to preferred embodiments, it will be evident that various other modifications are possible without departing from the scope of the invention as understood by those skilled in the art and as defined in the following claims. For instance, the nozzle 14 may have a different configuration for different types of gating.

The embodiments of the invention in which an exclusive property or privilege is claimed are defined as follows:

1. In an injection molding nozzle to be seated in an opening in a mold, the nozzle having a rear end, a front end, and a melt channel extending therethrough to convey melt forwardly toward at least one gate extending through the mold to a cavity, the nozzle having an elongated central body and an outer collar, the outer collar extending around the central body adjacent the rear end thereof and comprising two separate segments which are received around the elongated central body in a position interlocked with the elongated central body to prevent longitudinal movement of the elongated central body relative to the outer collar, the elongated central body of the nozzle having an elongated hollow core, a conductive portion cast around the hollow core and an electrical heating element with a helical portion extending between two lead portions, the helical portion of the electrical heating element being cast into the conductive portion around the elongated central core, each of the lead portions of the electrical heating element having a lead wire extending outwardly therefrom, one pair of abutting ends of the two segments of the outer collar each having a matching notch which in the interlocking position together form a radial opening extending through the outer collar through which the two lead portions of the electrical heating element extend outwardly into an insulative connector, the insulative connector having a pair of holes therethrough and an inner end portion securely received in the radial opening formed by the two notches, the improvement wherein;

an elongated protective tube fits over each of the outwardly extending lead portions of the electrical heating element, each of the protective tubes having an inner portion and an outer portion extending to an outer end, the inner portion of each protective tube being cast into the conductive portion of the central body, the outer portion of each protective tube fitting into one of the holes through the insulative connector, with the lead wire of each of the lead portions of the electrical heating element extending outwardly past the outer end of the tube further into said hole in the insulative connector for connection to a power wire.

2. An injection molding nozzle as claimed in claim 1 wherein each protective tube has a predetermined inner diameter to fit over one of the outwardly extending lead portions of the electrical heating element and a predetermined outer diameter to fit into one of the holes in the insulative connector.

3. An injection molding nozzle as claimed in claim 2 wherein the insulative connector is made of a ceramic material.

4. An injection molding nozzle as claimed in claim 3 wherein the protective tubes are made of stainless steel.

* * * * *

UNITED STATES PATENT AND TRADEMARK OFFICE
CERTIFICATE OF CORRECTION

PATENT NO. : 5,507,636
DATED : April 16, 1996
INVENTOR(S) : Jobst Ulrich Gellert It is certified that error appears in the above-indentified patent and that said Letters Patent is hereby corrected as shown below:

on the title page, item [54], Title should read
--Injection Molding Heated Nozzle with Protective Tubes--

Signed and Sealed this

Twenty-fifth Day of June, 1996

Attest:

BRUCE LEHMAN

*Attesting Officer*      *Commissioner of Patents and Trademarks*